United States Patent [19]
Robinson et al.

[11] 3,922,176
[45] Nov. 25, 1975

[54] ELECTROCHEMICAL CELLS HAVING A LIQUID ALKALI METAL ELECTRODE

[75] Inventors: Graham Robinson, Tarvin Chester; Ivor Wynn Jones, Chester, both of England

[73] Assignee: The Electricity Council, London, England

[22] Filed: Jan. 2, 1974

[21] Appl. No.: 430,363

[30] Foreign Application Priority Data
Jan. 3, 1973 United Kingdom................... 396/73

[52] U.S. Cl.............................. 136/6 FS; 136/83 R
[51] Int. Cl............................................ H01m 35/00
[58] Field of Search.......... 136/6 F, 6 FS, 20, 83 R, 136/153, 100 R

[56] References Cited
UNITED STATES PATENTS

| | | |
|---|---|---|
| 3,413,150 | 11/1968 | Kummer et al..................... 136/6 FS |
| 3,468,709 | 9/1969 | Kummer............................. 136/6 F |
| 3,758,337 | 9/1973 | Fally et al.......................... 136/6 FS |
| 3,770,502 | 11/1973 | Nakabayashi..................... 136/6 FS |
| 3,811,943 | 5/1974 | Minck et al....................... 136/6 FS |

*Primary Examiner*—Anthony Skapars
*Attorney, Agent, or Firm*—Browne, Beveridge, DeGrandi & Kline

[57] ABSTRACT

In an electrochemical cell, such as a sodium-sulphur cell, having a liquid metal electrode and a solid electrolyte, capillary means are provided to draw the liquid metal over one face of the electrolyte, so enabling the whole surface of the electrolyte to be in contact with the metal despite reduction in volume of the metal in the anodic compartment. The capillary means may be constituted by a narrow space between the electrolyte and another member, e.g. a housing, or by fibrous or porous material forming a wick.

12 Claims, 9 Drawing Figures

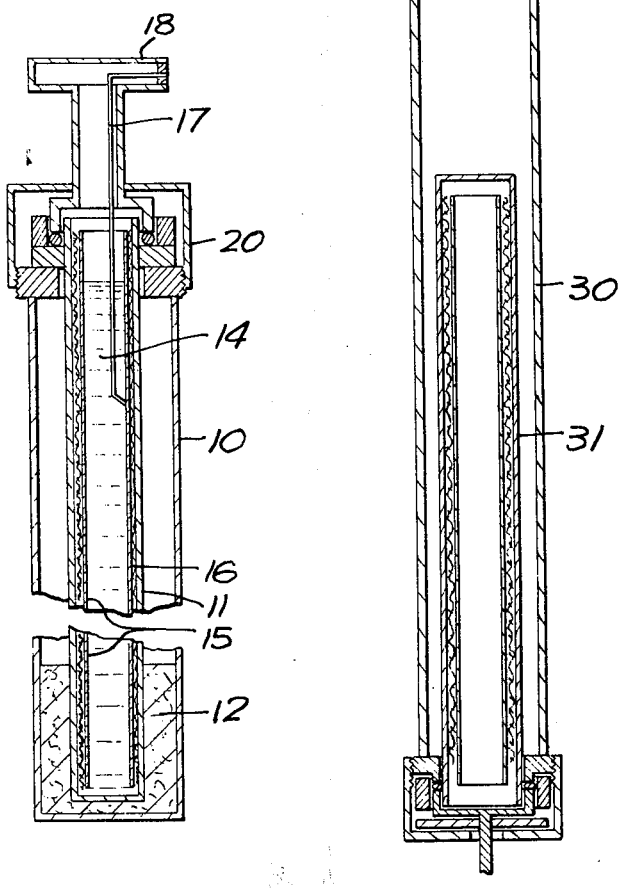
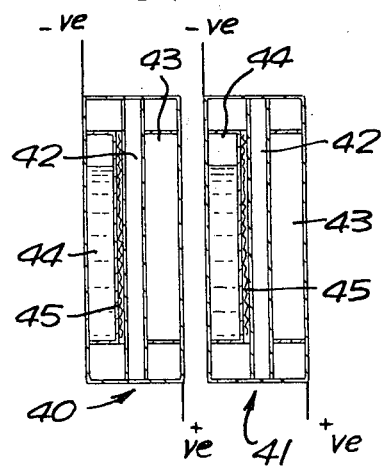

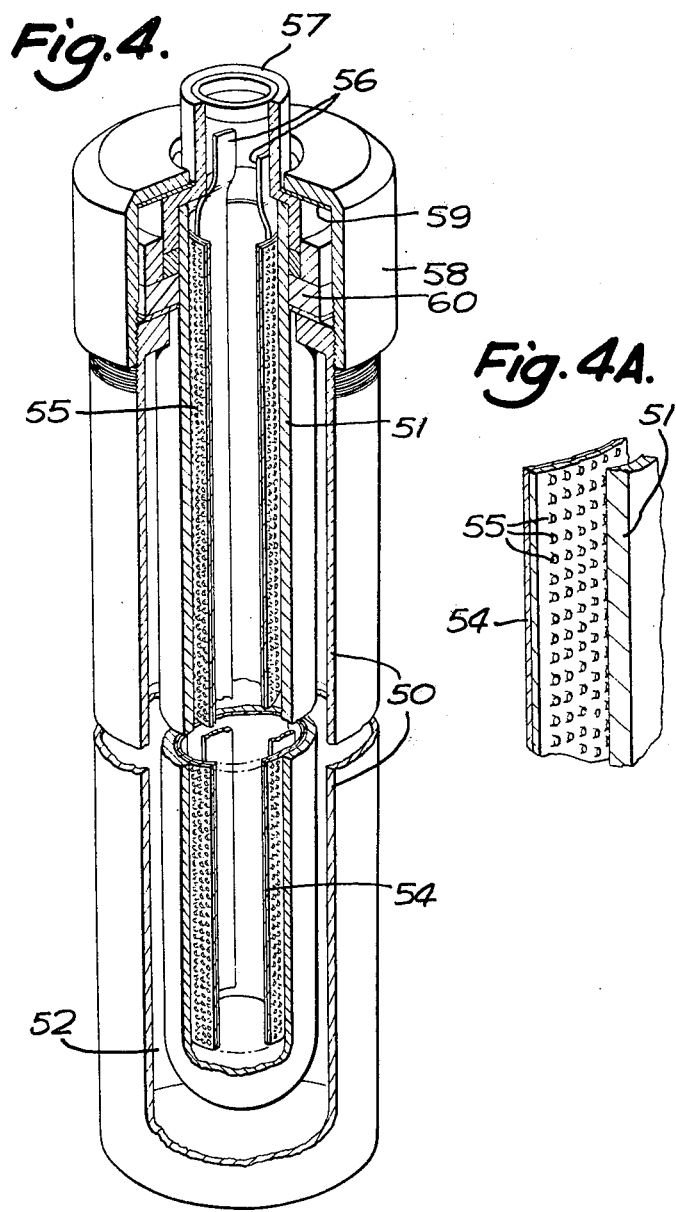

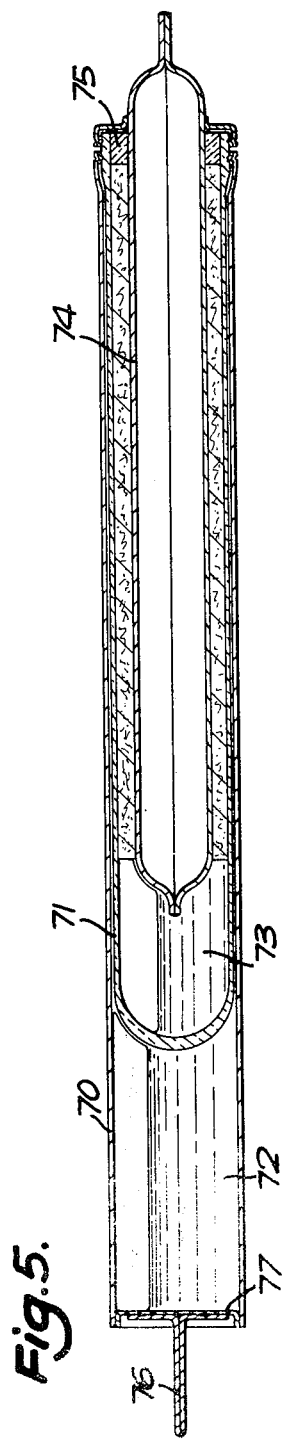

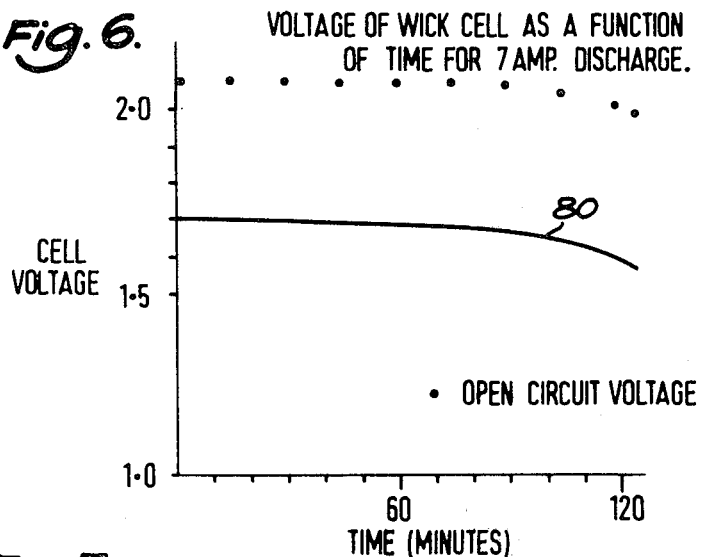
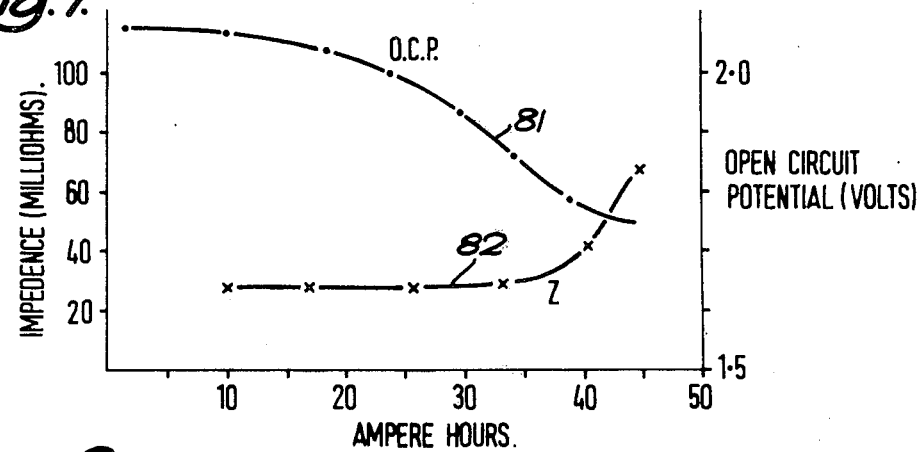
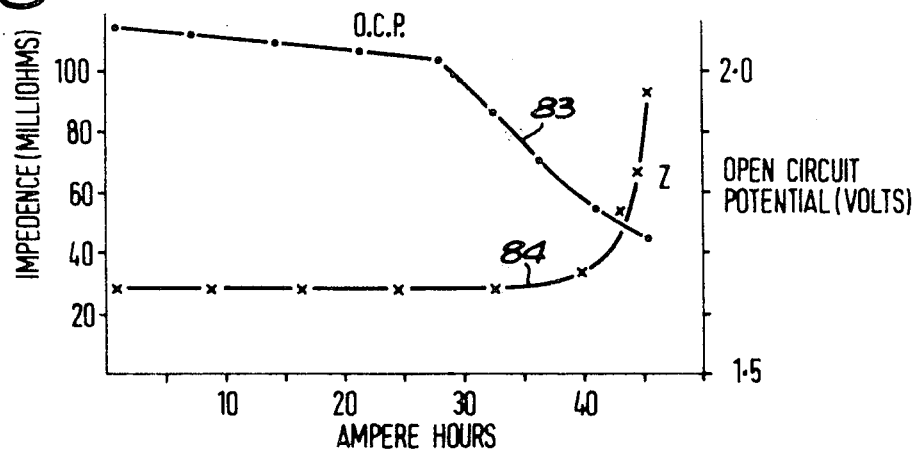

ELECTROCHEMICAL CELLS HAVING A LIQUID ALKALI METAL ELECTRODE

BACKGROUND OF THE INVENTION

1. Field of the Invention

This invention relates to electrochemical cells having a liquid alkali metal electrode. Such a cell makes use of a suitable cathodic reactant and has, between the alkali metal and cathodic reactant, a solid electrolyte in a form of a ceramic element, e.g. a membrane, that conducts ions of the alkali metal. A typical example of such a cell is a sodium-sulphur cell having a $\beta$-alumina ceramic membrane forming the electrolyte.

2. Prior Art

When such a cell with a liquid alkali metal electrode and ceramic membrane is passing current, electrons flow from the alkali metal forming the anode to the cathodic reactant through the external circuit. Positive ions of the alkali metal pass through the ceramic and combine with the negative ions of the reactant. The effect of discharging the cell is therefore to cause the alkali metal to pass through the ceramic membrane constituting the electrolyte. The main limitation to the power that can be derived from such a cell is the resistance of the ceramic membrane and this is inversely proportional to the area in contact with the alkali metal. Thus, if during discharge of the cell, the alkali metal level falls as the alkali metal passes through the electrolyte, then the effective area of alkali metal in contact with the electrolyte decreases progressively causing a rapid increase in resistance. Apart from the loss of power so caused, the concentration of current flow through the decreasing area of ceramic may damage the ceramic membrane. For this reason therefore it has heretofore been considered necessary to include in the resevoir holding the alkali metal required for the reaction enough alkali metal to maintain the required level in contact with the electrolyte when the reaction is complete. This extra alkali metal, which does not contribute to the electro-chemical process, is typically about one third of the total alkali metal.

Quite apart from the utilisation of the total amount of alkali metal, is not possible to increase the capacity of the cell in relation to the weight of alkali metal use, and power density by increasing the size of the effective electrode chamber in the cell. This may readily be seen by considering a cell having an electrode formed by a tube with the alkali metal inside the tube and the cathodic reactant outside the tube. If the power of the cell is increased by increasing the diameter of the ceramic tube, the surface area of the tube (and hence the power) increases linearly with increasing tube diameter but the weight of the unused alkali metal necessary to maintain the tube full would increase quadratically with increase of the tube diameter.

SUMMARY OF THE INVENTION

It is an object of the present invention to provide an improved form of cell with liquid alkali metal electrode in which the area of electrolyte in contact with the alkali metal can be maintained despite passage of the alkali metal through the electrolyte.

According to the present invention, in an electrochemical cell having a liquid metal electrode and a solid electrolyte, capillary means are provided against the face of the electrolyte arranged to draw the alkali metal upwardly to lie over the surface of the electrolyte despite changes in the level of the alkali metal.

The capillary means may be constituted by a narrow spacing between the electrolyte and a housing or between the electrolyte and another element, e.g. a metal conductor for effecting electrical connection to the alkali metal or by porous or fibrous or other material forming a wick.

The cell may have an electrode chamber sealed against one face of the electrolyte and containing the capillary means. The chamber may initially be filled or substantially filled with the alkali metal. However if the level of the alkali metal in the chamber should fall due to passage of ions through the electrolyte, the capillary means against this face of the electrolyte will maintain liquid alkali metal in contact with the whole region covered by the capillary means despite any fall in the level of the alkali metal in the chamber.

It will be noted that this construction may obviate any need to have a reservoir containing the alkali metal. For example, it has heretofore been the practice, in sodim sulphur cells of tubular form, to have a sodium reservoir to maintain the liquid level and thereby avoid the above-mentioned effects of a falling level. The presence of the capillary means overcomes this problem. A reservoir need only be provided if the further alkali metal is required for utilisation in the electrochemical reaction.

Alternatively however, the alkali metal may be arranged in a reservoir at one end of the capillary means. In one example, the capillary means are constituted by a narrow annual region between the cylindrical electrode and an outer housing and an alkali metal reservoir is at one end of the electrode. A further advantage of the arrangement of the present application arises because the electrolyte surface is kept wet by capillary action which is not dependent on gravity and hence the cell now no longer need be operated in a particular position with the reservoir above the electrolyte but will operate in any position. Hence there is no restriction on the orientation of the cell e.g. cylindrical cells may be operational with their axis horizontal.

The elimination or reduction in size of the reservoir or electrode chamber for the liquid alkali metal moreover leads to a further advantage in that it now becomes conveniently possible to provide a reservoir for the cathodic reactant above the level of the electrolyte thereby enabling an increase in the space available for storage of the cathodic reactant to be obtained. Such an increase in storage space for the cathodic reactant gives an increase in the capacity of the cell.

This invention is applicable not only to cells of tubular form but also to a flat plate type of cell in which the electrolyte is in the form of a flat plate and the cathodic reactant against the other face of the plate.

BRIEF DESCRIPTION OF THE DRAWINGS

FIGS. 1, 2, 3 and 4 are each diagrammatic sections of sodium-sulphur cells embodying the invention;

FIG. 4a is an enlarged view of part of FIG. 4;

FIG. 5 illustrates a further cell;

FIG. 6 is a graphical design illustrating the voltage of the cell of FIG. 1 as it is discharged; and FIGS. 7 and 8 are graphical diagrams illustrating the voltage of the cell of FIG. 4 as it is discharged.

DESCRIPTION OF THE PREFERRED EMBODIMENTS

Referring to FIG. 1 there is shown a sodium-sulphur cell comprising an outer stainless steel tube 10 around a tubular electrolyte 11 of β-alumina ceramic. The annular space between these tubes contains porous graphitic felt 12 and forms a reservoir for the sulphur which is liquid at the operating temperature of 350°C. The electrolyte tube 11 contains the liquid sodium 14. Within the electrolyte tube 11 is a cylinder 15 formed from a sheet of 0.05 mm stainless steel foil and having about four layers of 300 mesh stainless steel woven cloth 16 which are wrapped around the cylinder 15 before the cylinder is inserted within the electrolyte tube 11. The foil cylinder 15 tends to unroll and hence presses the cloth 16 into close contact with the inner wall of the electrolyte tube 11. The steel foil is connected by spot-welding to an aluminium wire 17 which is connected to a top cap 18. In assembling the cell, after the electrolyte tube 11 has been filled with sodium, the top cap 18 is sealed onto the open end of the tube 11. The annular region between the tube 11 and outer cylindrical container 10 is filled with the sulphur and this annular region is sealed by a further gap 20.

The stainless steel cloth 16 against the inner face of the electrolyte tube 11 acts as a wick which, by capillary action, maintains the inner surface of the electrolyte tube 11 wetted with sodium even if the sodium level in the central region within the tube 11 should fall below the level of the top of the electrolyte. This construction therefore allows the effective surface area of the ceramic tube to be used without any decrease as the cell is discharged. Electrochemically, the cell operates in the known way: when an external electronic conductor is connected between the sodium and sulphur electrodes, electrons flow from the sodium to the sulphur through that external conductor. The positive sodium ions and negative sulphur ions so formed combine, through passage of sodium ions through the electrolyte, to produce sodium sulphide in the sulphur reservoir.

Experimental results with a cell of the construction shown in FIG. 1 have shown that the discharge capacity is maintained with only a slight drop in the cell voltage until polarisation of the sulphur electrode begins to cause a decrease in the discharge voltage.

The construction of FIG. 1 may be modified to have a number of electrolytic tubes containing sodium within a single sulphur container.

Since the cell of FIG. 1 is not dependent upon gravity for the supply of sodium to the cermic surface, it is not restricted to operation in an upright position as shown in FIG. 1. Cells may be stacked in any orientation to suit a particular application or available space.

As shown in FIG. 2, the cell of FIG. 1 may be inverted. In the construction shown in FIG. 2, the outer tube 30 is lengthened compared with FIG. 1 in order to give an increase in the sulphur storage space. It will be noted that this can be done without any increase in the diameter of the annular region around the electrolyte 31. If the sulphur storage space was increased by increasing the diameter, a thicker layer of electrolyte will be required giving a higher cell resistance.

FIG. 3 illustrates a construction using flat electrolyte plates. In FIG. 3 there are shown two cells 40, 41 each having a flat β-alumina ceramic plate 42 forming the electrolyte with sulphur 43 adjacent one face of the plate and liquid sodium 44 against the other face of the plate 42. Capillary means as shown diagrammatically at 45 are provided on the face of the plate 42 to be wetted by the liquid sodium 44. Such capillary means 45 serve to keep the whole face covered by liquid sodium despite any fall of level in the main bulk of the sodium. The capillary means 45 may comprise a flat plate or gauze or cloth pressed mechanically against the surface of the ceramic electrolyte 42. Alternatively a sodium resistant porous material may be provided adjacent the face of the electrolyte 42.

FIG. 4 illustrates another construction of cell having a stainless steel tubular housing 50 closed at one end and containing a ceramic electrolyte tube 51 of 2 cm. bore and 20 cm. length in this example. The liquid sulphur/sulphide 52 lies between the tube 51 and the housing 50 and the liquid 53 inside the tube 51. A sheet 54 of stainless steel foil, 0.05 mm. by 185 by 120 mm., before assembly, was perforated over an area of about 185 mm. by 63 mm. with holes about 0.5 mm. in diameter and few mm. apart. The holes were punched in such a way that the material displaced by the punching projected on one side of the foil. Nickle current collectors 56 about 0.5 mm. thick and 10 mm. wide were spot welded to the unperforated part of the sheet, which was then rolled into a cylinder and inserted into the tube 51 so that the perforated part of the sheet 54 was adjacent to the inner wall of the tube 51 but spaced away therefrom by a distance of 0.1 to 0.5 mm. by the projections 55 punched in the punching operation. The resilience of the sheet 54 holds it outwardly against the tube 51. After assembly the current collectors 56 were spot welded to a negative terminal 56 at one end (the top end of FIG. 4) of the cell. The sodium and sulphur were put in the cell which was then sealed by a top cap 58 threaded onto the end of the housing 50, the cap being insulated by an insulating washer 59 from the negative terminal 57. An insulating spacer 60 locates the electrolyte tube 51 within the cap.

The annular region between the sheet 55 and the electrolyte tube 54 forms a capillary ensuring that the whole surface of the tube is in contact with the sodium.

FIG. 5 shows another construction of cell having an outer mild steel housing 70 within which is a ceramic electrolyte tube 71, the tubes 70, 71 being dimensioned so that the annular region between them is about 0.1 to 0.5 mm. wide. The tube 71 is located by dimples on the housing or by wire spot welding thereto or by putting a porous wick material between the electrolyte tube and housing. By using the narrow spacing however, sodium in a reservoir 72 at one end of the electrolyte tube covers the whole surface of that tube. The sulphur in this cell is inside the electrolyte tube in a reservoir 73. A metal tube or rod 74 extends into the sulphur reservoir and protrudes through a seal 75 at one end of the electrolyte tube 71 to form the positive terminal. The outer housing 70 constitutes the negative terminal and a connector 76 is attached to a closure member 77 welded into the other end of the electrolyte tube 71.

FIG. 6 is a graph showing the voltage of the cell of FIG. 1 as the cell discharges under load. The dots show the open circuit voltage which falls off slightly due to changes in sulphur electrode. The continuous line 80 shows the voltage under load. The difference between the two curves is a measure of the impedance and it will be seen that this remains substantially constant. This impedance depends on the area of the ceramic in contact with the sodium; due to the presence of the wick this area remains substantially constant despite the passage of the sodium through the electrolyte.

FIGS. 7 and 8 are graphs illustrating results obtained from the cell of FIG. 4 in the vertical and horizontal positions respectively. In FIG. 7, curve 81 shows the open circuit voltage which falls off as the cell is discharged due to sulphur electrode effects. The impedance shown by curve 82 however remains substantially constant at about 30 milliohms until the cell discharge was about 40 ampere-hours. In this particular cell the quantity of sodium inside the electrolyte would have fallen from 48 g. to about 8 g. and thus the level of the sodium, in the absence of the capillary means, would have been down to about 4 cm. from the bottom. In the absence of the capillary means, the impedance should have been of the order of 150 milliohms.

FIG. 8 is a graphical diagram similar to FIG. 7, curve 83 showing the open circuit voltage and curve 84 showing the impedance. The wick is slightly more efficient in the horizontal position because the smaller height to which the sodium has to be lifted.

We claim:

1. An electrochemical cell having a solid electrolyte between a liquid alkali metal anode electrode in an anode chamber and a cathodic reactant in a second chamber, wherein the anode chamber includes means providing a surface adjacent to and substantially uniformly spaced from the surface of said electrolyte to form a capillary region between said surfaces, said anode chamber further including a reservoir for said liquid alkali metal, said reservoir being located adjacent to and opening into said capillary region along at least one edge of the capillary region.

2. A cell as claimed in claim 1 wherein said means providing a surface comprises a wall of said anode chamber.

3. A cell as claimed in claim 1 wherein locating means are provided between said surfaces.

4. An electrochemical cell having a solid tubular electrolyte between a liquid metal anode electrode in an anode chamber and a cathodic reactant in the second chamber, wherein the cathodic reactant is sealed within the electrolyte tube and wherein the anode chamber comprises an outer cylindrical housing around and concentric with said electrolyte tube, the housing having an inner surface close to the electrolyte tube to form a capillary region around the outside of the electrolyte tube, said housing extending axially beyond at least one end of said electrolyte tube to form a reservoir open to said capillary region, said electrolyte tube having a closed end separating the reservoir from the cathodic reactant.

5. A cell as claimed in claim 4 wherein porous wick material is provided in said capillary region, said wick material being arranged to locate the electrolyte tube concentrically in said housing.

6. A cell as claimed in claim 5 wherein said wick is formed of fibrous material.

7. A cell as claimed in claim 5 wherein said wick if formed of metal mesh material.

8. A cell as claimed in claim 4 and having metal locating means in said capillary region to locate the electrolyte tube concentrically in said housing.

9. An electrochemical cell having a solid electrolyte tube between a liquid metal anode electrode in an anode chamber and a cathodic reactant in a second chamber, wherein the electrolyte tube is closed at one end and wherein said second chamber is constituted by a sealed housing around said electrolyte tube and wherein the anode chamber is within the electrolyte tube and wherein capillary means are provided within said electrolyte tube comprising an element having a generally cylindrical surface concentrically located within the electrolyte tube but spaced from the surface thereof to form a capillary region between the electrolyte tube and said element.

10. A cell as claimed in claim 9 wherein said element is a sheet element of resilient metal rolled to be resiliently located inside the electrolyte, said sheet element having projections on its outer face to space the sheet material from the electrolyte.

11. A cell as claimed in claim 10 wherein the sheet metal is apertured.

12. An electrochemical cell having a solid electrolyte between a liquid alkali metal anode electrode in an anode chamber and a cathodic reactant in a second chamber, wherein the anode chamber includes means providing a surface adjacent to and substantially uniformly spaced from the surface adjacent to and substantially uniformly spaced from the surface of said electrolyte to form a capillary region between said surfaces, and anode chamber further including a reservoir for said liquid alkali metal, said reservoir being located adjacent to and opening into said capillary region along at least one edge of the capillary region, said cathodic reactant in said second chamber being adjacent the solid electrolyte opposite to the said capillary region.

\* \* \* \* \*